(12) United States Patent
Hosotani et al.

(10) Patent No.: US 7,414,864 B2
(45) Date of Patent: Aug. 19, 2008

(54) SWITCHING POWER SUPPLY APPARATUS

(75) Inventors: Tatsuya Hosotani, Muko (JP); Hiroshi Takemura, Muko (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 109 days.

(21) Appl. No.: 10/547,775

(22) PCT Filed: Nov. 30, 2004

(86) PCT No.: PCT/JP2004/017745

§ 371 (c)(1),
(2), (4) Date: Sep. 1, 2005

(87) PCT Pub. No.: WO2005/076448

PCT Pub. Date: Aug. 18, 2005

(65) Prior Publication Data

US 2006/0176715 A1    Aug. 10, 2006

(30) Foreign Application Priority Data

Feb. 3, 2004    (JP)    ............................. 2004-027037

(51) Int. Cl.
*H02M 3/335* (2006.01)
(52) U.S. Cl. .................. 363/21.16; 363/97; 363/131
(58) Field of Classification Search .............. 363/21.12, 363/16, 20, 21.1, 21.16, 95, 97, 123, 131
See application file for complete search history.

(56) References Cited

U.S. PATENT DOCUMENTS 6,061,252 A * 5/2000 Hosotani ..................... 363/16

6,639,811 B2 * 10/2003 Hosotani et al. .............. 363/19

(Continued)

FOREIGN PATENT DOCUMENTS

CN    1405959 A    3/2003

(Continued)

OTHER PUBLICATIONS

Official Communication dated Aug. 3, 2005, issued in the corresponding Japanese PCT Application No. PCT/JP2004/017745.

(Continued)

*Primary Examiner*—Jeffrey L. Sterrett
*Assistant Examiner*—Stuart Hansen
(74) *Attorney, Agent, or Firm*—Keating & Bennett, LLP

(57) ABSTRACT

A switching power supply apparatus includes a first inductor that is serially connected to a primary winding of a transformer, and a second inductor that is arranged so as to apply a voltage of a capacitor with sine waves obtained by rectifying an AC input voltage for an on-period of a first switching circuit. A diode for preventing the inverse current to the second inductor and a capacitor that is charged by excitation energy charged to the second inductor and applies a voltage to the primary winding for on-period of the first switching circuit. Further, a capacitor is arranged so that the inductor, the primary winding, and a second switching circuit define a closed loop. Switching control circuits control the on-period of a first switching element to control an output voltage Vo, and further control an input voltage Vi by controlling the on-period of a second switching element.

20 Claims, 14 Drawing Sheets

U.S. PATENT DOCUMENTS

| | | | |
|---|---|---|---|
| 2003/0048645 A1* | 3/2003 | Hosotani et al. | 363/21.12 |
| 2003/0117818 A1 | 6/2003 | Ota | |
| 2003/0123265 A1* | 7/2003 | Uchida | 363/21.12 |
| 2003/0142514 A1 | 7/2003 | Hosotani et al. | |
| 2007/0195560 A1* | 8/2007 | Yasumura | 363/21.01 |

FOREIGN PATENT DOCUMENTS

| | | |
|---|---|---|
| JP | 04-021358 B | 1/1992 |
| JP | 07-075334 B | 3/1995 |
| JP | 07-264860 | 10/1995 |
| JP | 2653712 B2 | 5/1997 |
| JP | 11-187664 B | 7/1999 |
| JP | 2003-224973 | 8/2003 |
| JP | 2003-250272 | 9/2003 |

OTHER PUBLICATIONS

Official communication issued in the counterpart Chinese Application No. 200480006784.3, mailed on Aug. 17, 2007.

Official communication issued in the counterpart Chinese Application No. 200480006784.3, mailed on Feb. 1, 2008.

* cited by examiner

SWITCHING POWER SUPPLY APPARATUS

BACKGROUND OF THE INVENTION

1. Technical Field of the Invention

The present invention relates to a switching power supply apparatus which intermittently supplies the power from an input power supply, converts the power by an inductor, and outputs a predetermined DC voltage.

2. Description of the Related Art

Generally, a switching power supply apparatus has a harmonic property and a power-factor property. The harmonic property corresponds to a suppressing function of harmonic current flowing to an input power line from the switching power supply apparatus, and has a predetermined upper limit of the harmonic current to prevent any harmful influences on another device. The power-factor property corresponds to a power factor of input of the switching power supply apparatus and, preferably, may be increased so as to reduce the loss of a power system.

Japanese Unexamined Patent Application Publication No. 11-187664 (Patent Document 1), Japanese Unexamined Patent Application Publication No. 4-21358 (Patent Document 2) and Japanese Unexamined Patent Application Publication No. 7-75334 (Patent Document 3) disclose conventional switching power supply apparatuses.

FIG. 14 shows the structure of the switching power: supply apparatus disclosed in Patent Document 1. Referring to FIG. 14, a first switching circuit S1 is a parallel circuit including a first switching element Q1, a first diode D1, and a first capacitor C1. A second switching circuit S2 is a parallel circuit including a second switching element Q2, a second diode D2, and a second capacitor C2.

Reference numeral T denotes a transformer, and a first switching circuit S1 and an input power supply E are serially connected to a serial circuit including a primary winding T1 and an inductor L. A serial circuit including a second switching circuit S2 and a capacitor C is connected to a serial circuit including the primary winding T1 and the inductor L in parallel therewith. A secondary winding T2 of the transformer T includes a rectifying and smoothing circuit RS including a rectifying diode Ds and a smoothing capacitor Co. A capacitor Cs is connected to the rectifying diode Ds on the secondary side in parallel therewith. A detecting circuit 14 detects an output voltage Vo supplied to the load and output current Io, if necessary. A control circuit 11 inputs a voltage generated by a bias winding T3, and provides positive feedback to the switching element Q1, thereby self-oscillating the switching element Q1. A control circuit 12 inputs a voltage generated by a bias winding T4 and controls the off-timing of the switching element Q2, thereby controlling the on-period of the switching element Q2.

FIG. 15 shows the structure of the switching power supply apparatus disclosed in Patent Document 2. Referring to FIG. 15, an AC voltage supplied from an AC power supply 2 is rectified by a rectifier 4, and is smoothed by a smoothing capacitor 6, thereby obtaining a rectifying voltage Vin. Then, the rectifying voltage Vin is supplied to a first power converting unit 8 and a second power converting unit 10. When the switching transistor Qs is turned-on, the rectifying voltage Vin is added to a primary winding L1 including a choke coil CH, a diode Db, and a high-frequency transformer T, thereby charging the energy to the choke coil CH. The switching transistor Qs is turned-off, the energy of the choke coil CH sends the current to the diode Dc, the primary winding L1, and the capacitor C1. The on/off-operation of the switching transistor Qs is repeated and the voltage induced to a secondary winding L2 of the transformer T is smoothed by a diode D2 and a capacitor Co, thereby outputting a DC voltage Vo. A pulse width control circuit 16 controls the energization time of the switching transistor Qs in accordance with the change in output voltage Vo, thereby stabilizing the output voltage Vo.

FIG. 16 shows the structure of the switching power supply apparatus disclosed in Patent Document 3. Referring to FIG. 16, a full-wave rectifying circuit 2 inputs an AC input voltage from an input terminal 1-1', thereby outputting a rectifying voltage Ei. A first capacitor 3 smoothes the current of an inductor 20 via a second switching element 6 and a second capacitor 7, and supplies a DC voltage E3. A first switching element 4 converts, into an AC voltage, the rectifying voltage Ei via the inductor 20 and the DC voltage E3 of the first capacitor 7 via a primary winding 51 of a transformer 5, via a high-frequency switching operation. The second switching element 6 and the first switching element 4 are alternately turned on/off by the control circuit 11. The second capacitor 7 absorbs and releases a portion of excitation energy stored in the transformer 5 and the current of the inductor 20 for an on-period of the second switching element 6. A diode 8 and a capacitor 9 define a rectifying and smoothing circuit. The rectifying and smoothing circuit rectifies and smoothes a fly-back voltage of an AC voltage with a high frequency generated to a secondary winding 52, and further outputs a DC output voltage Eo to an output terminal 10-10'. The control circuit 11 detects the DC output voltage Eo and controls an on/off ratio of the first switching element 4 and the second switching element 6.

However, as disclosed in Patent Document 1, a voltage clamping circuit performs a zero-voltage switching operation (hereinafter, referred to as ZVS operation), thereby improving the efficiency. However, a harmonic-current suppressing function is not provided.

As disclosed in Patent Document 2, the harmonic-current suppressing function is provided. However, the ZVS operation is not executed. Therefore, the loss of switching operation is large and the circuit efficiency deteriorates. When the power supply is shut-off from the input power supply at the prompt stop of power supply, the voltage is greatly increased at the low load and is above the withstand voltage of the elements because of a non-control operation of a voltage of the capacitor C1 for ensuring an output holding time for continuously supplying the output for a predetermined time period.

As disclosed in Patent Document 3, a voltage clamping circuit performs the ZVS operation, and includes the harmonic-current suppressing function. However, the current generated by the switching operation flows to a diode for rectifying a commercial AC voltage (corresponding to the full-wave rectifying circuit 2 shown in FIG. 16), and therefore, the loss of the diode is substantial and the reducing effect of the harmonic current is reduced. Therefore, a low-pass filter must be provided in the commercial AC power line. Similar to Patent Document 2, since the voltage of the capacitor 3 for ensuring that the output holding time is not controlled, there is a problem in that the voltage greatly increases at the low load and the voltage exceeds the withstand pressure of the components.

SUMMARY OF THE INVENTION

To overcome the problems described above, preferred embodiments of the present invention provide a switching power supply apparatus which improves the effect of reducing the harmonic current, improves the harmonic property and power factor property, and improves the efficiency.

According to a preferred embodiment of the present invention, a switching power supply apparatus includes a first switching circuit S1 including a first switching element Q1, a first diode D1, and a first capacitor Cds1, a transformer T including a primary winding Lp and a secondary winding Ls, a first inductor Lr that is serially-connected to the primary winding Lp, a rectifying and smoothing circuit RS connected to the secondary winding Ls, a rectifying circuit Da on the input side including at least one rectifying element for rectifying an AC voltage, a second inductor element L1 connected such that a rectifying voltage obtained by the rectifying circuit Da is applied for an on-period for setting the first switching circuit S1 to a conductive state, a third capacitor connected such that excitation energy in the second inductor element L1 is charged and a voltage is applied to the primary winding Lp for the on-period, and a switching control circuit for controlling the first switching element Q1 so as to obtain an output from the rectifying and smoothing circuit RS connected to the secondary winding Ls.

The switching power supply apparatus further includes a second switching circuit S2 including a parallel connecting circuit including a second switching element Q2, a second diode D2, and a second capacitor Cds2, and a fourth capacitor Cr serially-connected to the second switching circuit S2.

In the switching power supply apparatus, one end of the serial circuit of the second switching circuit S2 and the fourth capacitor Cr is connected to one end of the first switching circuit S1, and the switching control circuit controls the operation such that the first switching element Q1 is turned off and then the second switching element Q2 is turned on, and the second switching element Q2 is turned off and then the first switching element Q1 is turned on, thereby controlling the amount of charging of the third capacitor Ci via the first switching circuit S1 for the on-period.

In the switching power supply apparatus according to this preferred embodiment, the switching control circuit preferably controls the on-period of the first switching element Q1 so as to stabilize an output voltage obtained by the rectifying and smoothing circuit RS.

In the switching power supply apparatus according to this preferred embodiment, the switching control circuit preferably controls the on-period of the second switching element Q2 in accordance with voltages at both ends of the third capacitor Ci.

The switching control circuit preferably controls the on-period of the second switching element Q2 so as to stabilize an output voltage obtained by the rectifying and smoothing circuit RS, and controls the on-period of the first switching element Q1 in accordance with voltages at both ends of the third capacitor Ci.

The switching power supply apparatus preferably includes a second transformer T2 that is different from the transformer T, the second inductor element Li includes an input winding of the second transformer T2, and a rectifying circuit Ds2 is arranged between an output winding Lo of the second transformer T2 and the rectifying and smoothing circuit RS.

The switching power supply apparatus preferably includes a second transformer T2 that is different from the transformer T, an input winding Li1 of the second transformer T2 is serially connected to the second inductor Li, and a rectifying circuit Ds2 is arranged between an output winding Lo of the second transformer T2 and the rectifying and smoothing circuit RS.

A tri-winding Lt is preferably connected to the transformer T, and a second inductor Li is serially connected to the tri-winding Lt.

A single or a plurality of driving windings Lb1 and Lb2 are preferably connected to the transformer T, and the switching control circuit drives the first switching element Q1 or the second switching element Q2 by using voltages generated in the driving windings Lb1 and Lb2.

Delay circuits DL1 and DL2 including serial circuits including resistors Rg1 and Rg2 and capacitors Cg1 and Cg2 are preferably provided between control terminals between the driving windings Lb1 and Lb2 and the first and second switching elements Q1 and Q2, and the switching control circuit delays the driving windings Lb1 and Lb2 after generating voltages for turning on the switching elements Q1 and Q2, and turns on the switching elements Q1 and Q2.

Delay times of the delay circuits DL1 and DL2 are preferably set so as to be turned-on after the voltages applied to both the ends of the first and second switching elements Q1 and Q2 are reduced to zero or near the zero voltage.

In the switching power supply apparatus, the switching control circuit preferably includes time-constant circuits TC1 and TC2 for turning-off the switching elements Q1 and Q2 after a predetermined time of the generation of voltages for turning-on the switching elements Q1 and Q2 in the driving windings Lb1 and Lb2.

The switching control circuit preferably controls the first switching element Q1 so as to set an intermittent oscillation operating mode for periodically repeating an oscillation period to turn on/off the first and second switch elements Q1 and Q2 and an oscillation stop period for stopping the oscillation at the timing of low load or non-load.

In the switching power supply apparatus, a leakage inductance of the transformer T preferably includes a first inductor Lr.

At least one of the first switching circuit S1 and the second switching circuit S2 preferably includes a field-effect transistor.

According to preferred embodiments of the present invention, the ZVS operation of the switching elements Q1 and Q2 greatly reduces the switching loss. In addition, the turn-off operation of the switching element Q1 inverts the transformer voltage to thereby turn on the switching element Q2. The turn-off operation of the switching element Q2 and the diode Ds inverts the transformer voltage to thereby turn on the switching element Q1. Consequently, both the switching element Q1 and the switching element Q2 are not simultaneously in the on-operation under the principle, and problems such as destruction due to the simultaneous turn-on operation is not caused. The output voltage Vo is controlled to be stabilized by controlling the on-period of the switching element Q1 based on the signal from the feedback circuit FB1. The input voltage Vi is controlled by controlling the on-period of the switching element Q2 based on the signal from the feedback circuit FB2. In particular, at the timing of low load, the on-period of the switching element Q2 is reduced, thereby reducing the on-period of the switching element Q1 and preventing the increase in capacitor voltage Vi.

The on-period of the first switching element Q1 is preferably controlled so as to stabilize the output voltage obtained by the rectifying and smoothing circuit RS to thereby use the switching power supply apparatus as a constant-voltage power supply apparatus.

The on-period of the second switching element Q2 is preferably controlled in accordance with the voltages at both ends of the fourth capacitor Ci to thereby control the amount of charge of the fourth capacitor Ci via the first switching circuit S1 for the on-period and preventing the over-increase of the voltage applied to the capacitor Ci at the timing of low load or non-load.

The switching control circuit preferably controls the on-period of the second switching element Q2 so as to stabilize an output voltage obtained by the rectifying and smoothing circuit RS, and controls the on-period of the first switching element Q1 in accordance with voltages at both ends of the third capacitor Ci. Consequently, the fourth capacitor Ci is charged via the first switching circuit S1 for the on-period, and both the output voltage Vo and the voltage Vi of the capacitor Ci are stabilized.

A second transformer T2 that is different from the transformer T is preferably provided, the second inductor element Li includes an input winding of the second transformer T2, and a rectifying circuit Ds2 is arranged between an output winding Lo of the second transformer T2 and the rectifying and smoothing circuit RS. Consequently, the energy charged to the second inductor Li is directly supplied to the secondary side, and the winding current of the transformer T is reduced to reduce the conductive loss, thereby improving the efficiency.

A second transformer T2 that is different from the transformer T is preferably provided, an input winding Li1 of the second transformer T2 is serially connected to the second inductor Li, and a rectifying circuit Ds2 is arranged between an output winding Lo of the second transformer T2 and the rectifying and smoothing circuit RS. Consequently, the voltage applied to the inductance element Li is adjusted by using the voltage generated to the output winding of the second transformer T2. Further, the conductive angle of the input current is widened to minimize the harmonic current and, on the contrary, the conductive angle is narrow to prevent the increase in voltage of the capacitor Ci, thereby improving the efficiency.

A tri-winding Lt is preferably connected to the transformer T and a second inductor Li is serially connected to the tri-winding Lt. Thus, the voltage applied to the inductance element Li is adjusted by using the voltage of the tri-winding of the transformer. Further, the conductive angle of the input current is widened to minimize the harmonic current and, on the contrary, the conductive angle is narrow to prevent the increase in voltage of the capacitor Ci, thereby improving the efficiency.

A single or a plurality of driving windings Lb1 and Lb2 are preferably connected to the transformer T, and the switching control circuit drives the first switching element Q1 or the second switching element Q2 by using voltages generated in the driving windings Lb1 and Lb2. Thus, the self-oscillation is possible.

Delay circuits DL1 and DL2 including serial circuits including resistors Rg1 and Rg2 and capacitors Cg1 and Cg2 are preferably arranged between control terminals between the driving windings Lb1 and Lb2 and the first and second switching elements Q1 and Q2, the switching control circuit delays the driving windings Lb1 and Lb2 after generating voltages for turning on the switching elements Q1 and Q2, and turns on the switching elements Q1 and Q2. Thus, the dead time is inserted, the simultaneous turn-on state of both the first and second switching elements Q1 and Q2 does not exist under the principle, the ZVS operation reduces the switching loss.

The delay times of the delay circuits DL1 and DL2 are preferably set such that the voltages applied to both ends of the first and second switching elements Q1 and Q2 are reduced to the zero voltage or near the zero voltage and thereafter the first and second switching elements Q1 and Q2 are turned-on. Thus, the ZVS operation reduces the switching loss and the efficiency is improved.

The operation of the time-constant circuits TC1 and TC2 generates the voltages for turning-on the switching elements Q1 and Q2 at the driving windings Lb1 and Lb2, after a predetermined time, and the switching elements Q1 and Q2 are turned-off. The on-period of the switching elements Q1 and Q2 is determined without any influences from the voltage change of the driving windings Lb1 and Lb2.

The mode shifts to an intermittent oscillation mode for alternately repeating the oscillation period and the oscillation stop period at the timing of low load or non-load. The voltages at both ends of the fourth capacitor Ci are effectively minimized, and the number of switching times per unit time is reduced. The switching loss and the conductive loss are minimized, thereby improving the efficiency.

According to preferred embodiments of the present invention, the leakage inductance of the transformer T is preferably used as the first inductor Lr, thereby decreasing the number of parts.

According to preferred embodiments of the present invention, at least one of the first switching circuit S1 and the second switching circuit S2 preferably includes a field-effect transistor. Consequently, the diode D1 and D2 include parasitic diodes, and the capacitors Cds1 and Cds2 include parasitic capacitors. A parallel connecting circuit including the switching element Q1 and Q2, the diode D1 and D2, and the capacitors Cds1 and Cds2 has a small number of components.

These and other features, elements, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
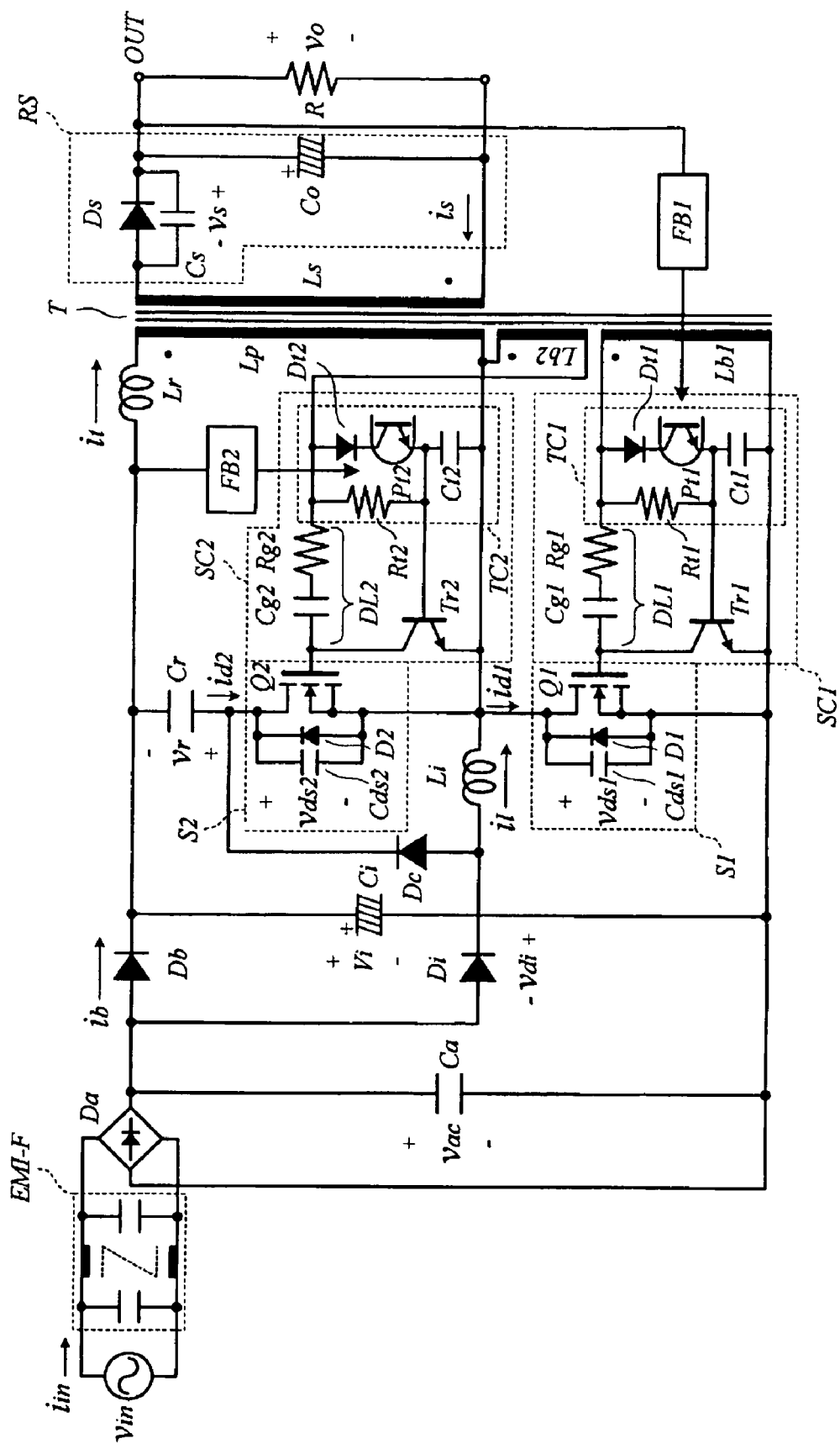
FIG. 1 is a circuit diagram showing a switching power supply apparatus according to a first preferred embodiment of the present invention.
Figure 2:
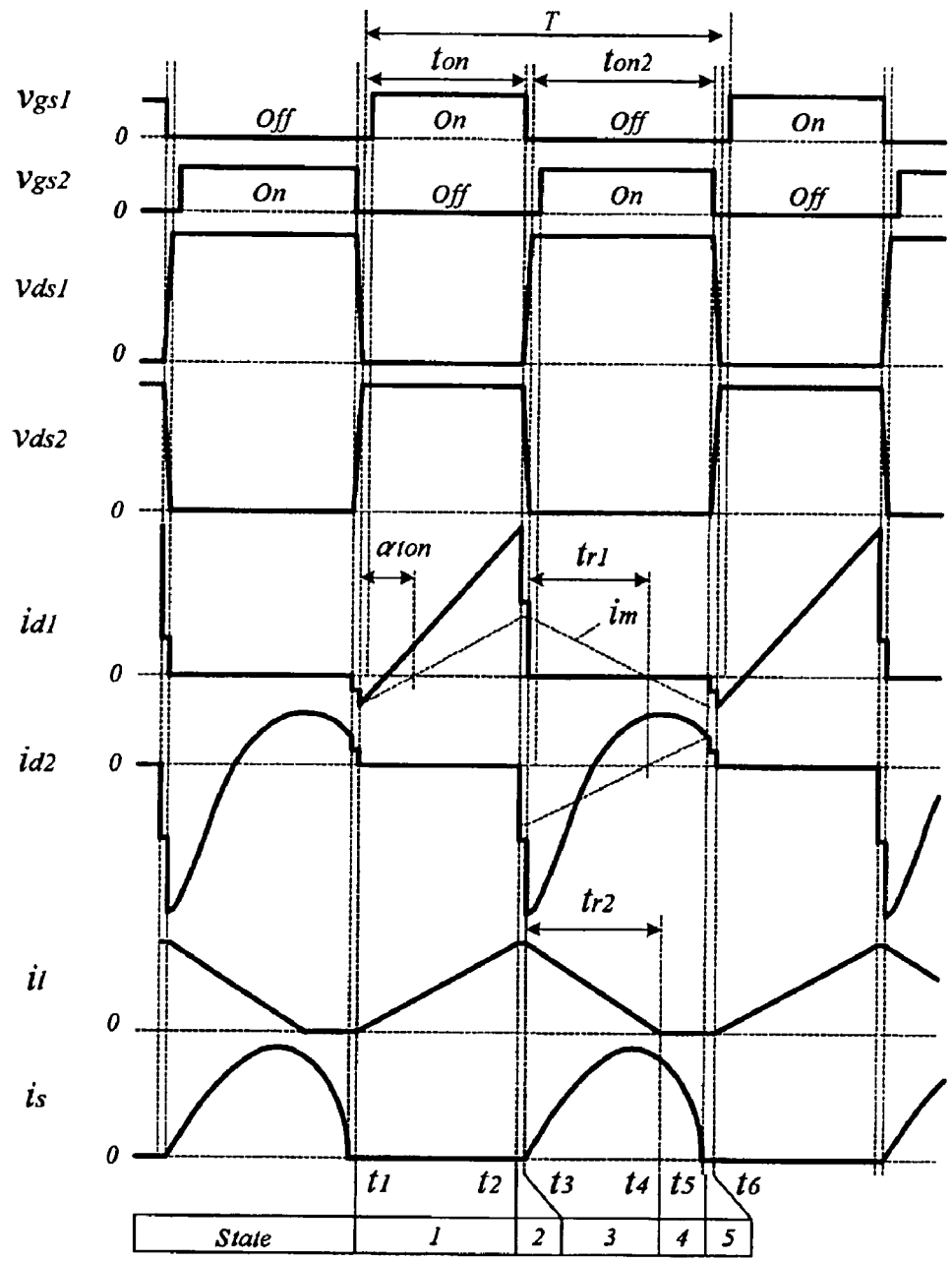
FIG. 2 is a waveform diagram of units in the switching power supply apparatus.
Figure 3:
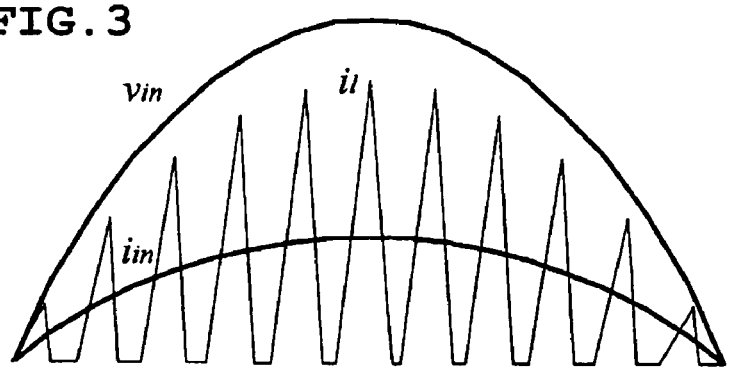
FIG. 3 is a diagram showing waveforms of an input voltage, input current, and current flowing to an inductor.

A description is given of a switching power supply apparatus according to a first preferred embodiment with reference to FIGS. 1 to 3.

FIG. 1 is a circuit diagram showing the switching power supply apparatus. Referring to FIG. 1, reference numeral Vin denotes a commercial AC power supply. A rectifying circuit Da on the input side includes a diode bridge, and rectifies full waves of the commercial AC power supply Vin via an EMI filter EMI-F. A first switching circuit S1 includes a first switching element Q1, a first diode D1, and a first capacitor Cds1. Similarly, a second switching circuit S2 includes a second switching element Q2, a second diode D2, and a second capacitor Cds2. The diodes D1 and D2 are parasitic diodes of the switching element Q1 and Q2, serving as FETs. The capacitors Cds1 and Cds2 are parasitic capacitors of the first and second switching elements Q1 and Q2. However, the diodes D1 and D2 and the capacitors Cds1 and Cds2 may be added, independently of the first and second switching elements Q1 and Q2 for obtaining the necessary properties.

A rectifying voltage of the rectifying circuit Da on the input side is applied to a capacitor Ca. The transformer T includes a primary winding Lp, a secondary winding Ls, and driving windings Lb1 and Lb2. Connected to the secondary winding Ls of the transformer T is the rectifying and smoothing circuit RS including a rectifying diode Ds and a smoothing capacitor Co. Connected to the rectifying diode Ds is a resonant capacitor Cs arranged in parallel therewith, for the purpose of the resonant operation in the inverse of voltage of the transformer. Incidentally, a parasitic capacitance of the diode Ds can be used as the capacitor Cs, and individual components are not used. A first inductor Lr and a second inductor Li are serially connected to the primary winding Lp of the transformer T. As the first inductor Lr, a leakage inductance of the transformer T can be used.

A fourth capacitor Cr is serially connected to the second switching circuit S2. The closed-loop preferably includes the second switching circuit S2, the fourth capacitor Cr, the first inductor Lr, and the primary winding Lp of the transformer T. Moreover, one end of the second inductor Li is partially connected to a connecting point of the first switching circuit Si and the second switching circuit S2, and another end of the second inductor Li is connected to a third diode Di. Moreover, both ends of a fourth diode Dc are connected to a connected point of the second switching circuit S2 and-the fourth capacitor Cr and a connecting point of the third diode Di and the second inductor Li.

A third capacitor Ci is connected between a connecting point of the first switching circuit S1 and the third capacitor Ca and one end of the first inductor Lr.

Switching control circuits SC1 and SC2 are connected to the first and second switching circuits S1 and S2. A fourth diode Db is connected between the rectifying circuit Da on the input side and the third capacitor Ci.

The switching control circuit SC1 includes a transistor Tr1 between a gate and a source of the first switching element Q1, a delay circuit DL1, and a time-constant circuit TC1. The delay circuit DL1 includes a serial circuit including a capacitor Cg1 and a resistor Rg1. The first switching element Q1 is turned on by an induced voltage of the driving winding Lb1, and the delay circuit DL1 delays a turn-on timing of the first switching element Q1.

The time-constant circuit TC1 includes an impedance circuit including a resistor Rt1, a diode Dt1, and a phototransistor Pt1 of a photocoupler and a capacitor Ct1. The time-constant circuit TC1 and the transistor Tr1 control the turn-off operation of the first switching element Q1.

The second switching control circuit SC2 preferably has the same structure and operations as that of the first switching control circuit SC1.

A feedback circuit FB1 is connected to the phototransistor Pt1 of the photocoupler of the first switching control circuit SC1. The feedback circuit FB1 detects a voltage Vo outputted to an output terminal OUT from the rectifying and smoothing circuit RS, and controls the feedback operation for stabilizing the voltage Vo. A second feedback circuit FB2 detects an input voltage Vi of the third capacitor Ci, and controls the feedback operation for controlling the on-period of the second switching element Q2 so as to prevent the increase in input voltage Vi from a predetermined value at the timing of low load.

The capacitor Ca flows (shunts), to ground, high-frequency current generated by switching the switching elements Q1 and Q2, thereby returning the high-frequency current to the input power supply. An inductor or other suitable component may be inserted, thereby defining a low-pass filter including an inductance thereof and a capacitance of capacitor Ca.

Next, a description is given of the circuit operation of the switching power supply apparatus shown in FIG. 1 with reference to FIGS. 2 and 3.

FIG. 2 is a waveform diagram of the units shown in FIG. 1. FIG. 3 is a schematic waveform diagram of an input voltage Vin for commercial power supply, input current iin, current il flowing to the inductor Li. Reference numerals Vgs1 and Vgs2 denote driving signals (voltages between gates and sources) of the switching element Q1 and Q2. Reference numerals Vds1 and Vds2 denote voltages between drains and sources of the switching element Q1 and Q2. Reference numerals id1 and id2 denote drain current. Reference numeral im denotes excitation current of the transformer T. Reference numeral is denotes current flowing to the secondary winding. Reference numeral il denotes current flowing to the inductor Li. The foregoing expresses the operation in states.

(1) State 1 [t1 to t2]

The diode D1 is a first conductive element, and a voltage of the driving winding Lb1 turns-on the switch Q1. Thus, the switch Q1 performs the ZVS operation. In state 1, voltages at both ends of the capacitor C1 are applied to the primary winding Lp, as the input voltages Vi, and the excitation inductance of the primary winding Lp is excited. A full-wave rectifying voltage Vac is applied to the inductor Li via the switch Q1. Referring to FIG. 2, at time αton, the excitation current im of the transformer T becomes negative. For the period, the capacitor Ci is charged by the loop including the capacitor Ci, the switch Q1, the primary winding Lp, and the inductor Lr.

At time t2, the voltage of the capacitor Ct1 is a threshold voltage of the transistor Tr1, thereby turning-on the transistor Tr1 and turning-off the switch Q1. Then, the voltage of the transformer T (voltage of winding of the transfer T) is inversed.

(2) State 2 [t2 to t3]

The current flowing to the primary winding Lp and the inductor Lr and the current flowing to the inductor Li charge the capacitor Cds1. The capacitor Cds2 is discharged. At time t3, the voltage Vds2 is zero voltage, and the diode D2 is conductive. On the secondary side of the transformer T, the voltage Vs is zero and then the rectifying diode Ds is conductive.

(3) State 3 [t3 to t4]

At the conductive time of the diode D2, the voltage of the driving winding Lb2 turns-on the switch Q2, thereby performing the ZVS operation. On the primary side of the transformer T, a resonant circuit includes a loop including the primary winding Lp, the switch Q2, the capacitor Cr, and the inductor Lr, and the inductor Lr and the capacitor Cr are resonant, thereby flowing resonant current. The excitation current il charged to the inductor Li flows to the capacitor Ci via the switch Q2 and the capacitor Cr, thereby charging the capacitor Ci. On the secondary side of the transformer T, the excitation energy of the transformer T is discharged from the secondary winding Ls, and then the current is flowing to the diode Ds indicates a curved waveform. Referring to FIG. 2, reference numeral tr1 denotes the reset time of the transformer T. At time t4 (after the passage from the time t3 to the time tr2), the current il is zero and then the charge operation of the capacitor Ci using the excitation current il ends.

(4) State 4 [t4 to t5]

The current il is zero and then the diode Dc is conductive. Both ends of inductor Li are short-circuited together with the switching element Q2, and the voltage applied to the diode Di is clamped. In state 3 and state 4, a voltage Vr of the capacitor Cr is applied to a serial circuit including the primary winding Lp and the inductor Lr, and the excitation current im is linearly reduced. The excitation current im is zero and then is negative current. On the secondary side, the current flows until the current is is zero. At time t5, the voltage of a capacitor Ct2 is a threshold voltage of a transistor Tr2, and the transistor Tr2 is turned on and then the switch element Q2 is turned off.

(5) State 5 [t5 to t6]

On the secondary side of the transformer T, an inverse voltage is applied to the diode Ds, and the voltage of the secondary winding Ls of the transformer T is inverted. On the primary side, the current flowing to the primary winding Lp and the inductor Lr discharge the capacitor Cds1, and the capacitor Cds2 is charged. At time t6, the voltage Vds1 is zero and then the diode D1 is conductive.

The above-mentioned states 1 to 5 are repeated.

The circuit property of the switching power supply apparatus shown in FIG. 1 is as follows.

Reference numeral ton denotes the time for on-period for which the switching circuit S1 is conductive. Reference numeral ton2 denotes the time for the period for which the switching circuit S2 is conductive. Reference numeral Vac denotes a voltage of the capacitor Ca. Reference numeral Vi denotes a voltage of the capacitor Ci. Reference numeral n denotes a ratio of the number of secondary windings of the transformer and the number of primary windings. Then, the following formula is established by the product of the time and the voltage applied to the applied to excitation inductance L of the transformer.

$$Vi \times ton = nVo \times ton2 \quad (1)$$

Further, the following formula is established by the product of the time and the voltage applied to the inductor Li.

$$Vac \times ton = (Vi + nVo - Vac) \times tr2 \quad (2)$$

In the above formula, at the time tr2, the current: il flowing to the inductor Li is zero for off-period. When the output power is constant, the voltage Vi is constant for one period of an AC input voltage. The time ton is controlled and then the ratio of ton/ton2 is controlled by the following formula (1), thereby stabilizing the output voltage Vo.

The input current iin is obtained by the following formula using an average of the current flowing to the inductor Li for one switching period.

$$iin = Vac \cdot nVo \cdot ton / \{2Li(Vi + nVo - Vac)\} \quad (3)$$

Figure 11:
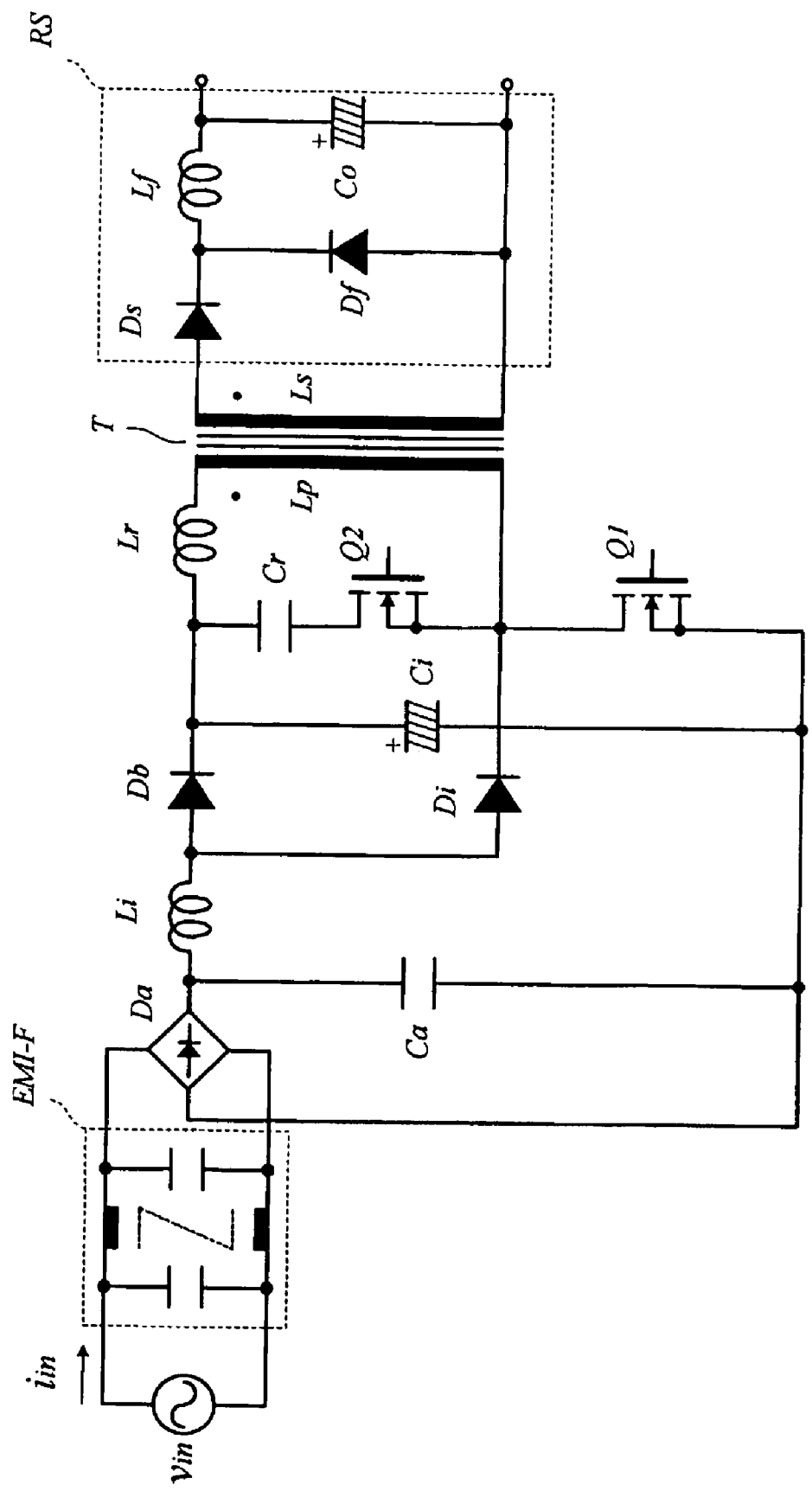
FIG. 11 is a circuit diagram showing a switching power supply apparatus according to the ninth preferred embodiment of the present invention.

Referring to FIG. 11, the input current iin has a sine wave, and the harmonic component of the input current is greatly reduced. When the voltage Vi increases, the current iin is substantially a sine wave. The distortion ratio is reduced and the harmonic current is minimized.

A prompt input-power p1 at the full-wave rectifying voltage Vac is expressed by the following formula.

$$p1 = Vac \times iin \quad (4)$$

Thus, the time ton is erased by the formulae (1), (3), and (4).

$$p1 = (Vac \cdot nVo)^2 / \{2LiVi(Vi + nVo - Vac)\} \times ton2 \quad (5)$$

The power p1 is proportional to the time ton2. When the time ton2 is constant and the voltage Vi increases. Then, the power p1 reduces. On the contrary, when the output power reduces, the voltage Vi increases. On the contrary, the time ton2 is controlled, thereby controlling the power p1. The change in voltage Vi to the change in input power is controlled, thereby preventing the increase in voltage Vi when the output power is low.

Reference numeral α establishes a relationship among a reset time tr1 and the on-period ton2 of the transformer.

$$(1-\alpha)ton2 = tr1, ton2 = tr1 + \alpha ton2 \quad (6),$$

where αton2: time for exciting the transformer in the inverse direction. The charges of the capacitor Cr for off-period excites the transformer in the inverse direction, and the third capacitor Ci is charged via the first switching circuit S1 for the on-period. Reference numeral αton denotes a charge period for the on-period, and the amount Qa of charges is expressed by the following formula.

$$Qa = Vi(\alpha ton)^2 / 2L = (nVo \cdot \alpha ton2)^2 / (2Vi \cdot L) \quad (7)$$

The amount Qa are charges circulated for one switching period, and becomes the energy which does not relate to the output. In the formula (6), the on-period ton2 is obtained by adding the time αton2 for exciting the transformer in the inverse direction for the reset time tr1 of the transformer for output, and the time ton2 is long in view. When the time αton2 is long and the amount Qa of charges is large, the voltage Vi increases based on the formula (5). The waveform of input current is approximate to a sine wave, and the harmonic current is minimized. On the contrary, when the time αton2 is reduced and the amount Qa of charges is reduced, the increase in voltage Vi is prevented based on the formula (5).

Therefore, the time αton2 or time αton is properly controlled to control the amount Qa of charges, thereby stabilizing the voltage Vi and minimizing the harmonic current.

Further, an amplitude Impp of excitation current im is expressed by the following formula.

$$Impp=(Vi/L)\times ton \quad (9)$$

Further, the following formula is expressed by using an amplitude Ilpp of the current il flowing to the inductor Li.

$$Ilpp=(Vac/Li)\times ton \quad (10)$$

Therefore, power p2 sent from the transformer T to the secondary side is expressed by the following formula.

$$p2=nVo\{(1-2\alpha)Impp\cdot ton2/2T+Ilpp\cdot tr2/2T\} \quad (11)$$

When the power p2 is constant, the value α changes for input period, and changes in accordance with the change in the time tr2 and a current peak value Ilpp proportional to the full-wave rectifying voltage Vac.

As mentioned above, the on-period ton is controlled to stably control the output voltage, and the on-period ton2 is controlled in accordance with the output power and the peak value of the AC input voltage, thereby controlling the amount Qa of charge. Both the suppression of harmonic current of the input current and the suppression of increase in voltage Vi are established. In particular, the amount Qa of charges increases in the high load and thus the waveform of the input current is approximate to a sine wave. In the low load, the amount Qa of charges is reduced, thereby preventing the increase in voltage Vi.

According to preferred embodiments of the present invention, a period αton for charging the third capacitor Ci via the first switching circuit S1 is added to the on-period. For the period αton, the switching element Q1 is turned on, thereby performing the zero-voltage switching operation of the switching element Q1 and reducing the low of switching.

Further, a switching surge voltage by leakage inductance in the turn-off operation of the switching element Q1 is greatly reduced by a voltage clamping circuit which serially connects the second switching circuit S2 and the fourth capacitor Cr, and the low-voltage stress of the switching circuit is realized.

For one period of the AC input voltage, the on-period ton is constant. Therefore, the response property of a control circuit for stabilizing the output voltage is high.

Static energy charged to the capacitor Ci sufficiently ensures the holding time of output voltage.

Referring to FIG. 1, at the low load or non-load, a predetermined load sufficiently reduces the on-period. When the delay time until the transistor Tr1 is turned-on is shorter than the delay time until the switching element Q1 is turned-on after the voltage for turning-on the switching element Q1 is generated in the driving winding Lb1, the transistor Tr1 is turned on earlier than the switching element Q1 and the oscillation temporarily stops. Then, the mode shifts to an intermittent oscillation operating mode in which the oscillation period and the stop period intermittently repeat. In this case, the energy charged in the inductor Li per unit time is reduced, and the increase in voltage at both ends of the fourth capacitor Ci is effectively prevented. The number of switching times per unit time is reduced, thereby reducing the conductive loss and the switching low and improving the efficiency. The delay time until the switching element Q1 is turned on is set by a time constant of a delay time DL1 of the capacitor Cg1 and the resistor Rg1. The delay time until the transistor Tr1 is turned on is set by a time constant of the time-constant circuit TC1 including the resistor Rt1, the phototransistor Pt1, and the capacitor Ct1.

The advantages of the switching power supply apparatus shown in FIG. 1 are as follows.

(1) The ZVS operation greatly reduces the switching loss of the switching elements Q1 and Q2.

(2) The turn-off operation of the switching element Q1 reverses the transformer voltage, and the switching element Q2 is turned on. Then, the switching element Q2 and the diode Ds are turned off, thereby inversing the transformer voltage. Then, the switching element Q1 is turned on. Thus, the simultaneous on-operation of the switching element Q1 and the switching element Q2 is not established based on the principle, and a default such as the destruction due to the simultaneous on-operation is not generated.

(3) The output voltage Vo is stabilized by controlling the on-period of the switching element Q1. The input voltage Vi is controlled based on the signal from the feedback circuit FB1 by controlling the on-period of the switching element Q2 based on the signal from the feedback circuit FB2.

(4) In particular, in the low load, the on-period of the switching element Q2 is reduced, thereby reducing the on-period of the switching element Q1 and the increase in capacitor voltage Vi is prevented.

(5) In the low load or non-load, the mode shifts to the intermittent oscillating mode in which the oscillating period and the oscillation stop period are alternately and periodically repeated. The increase in voltages at both ends of the third capacitor Ci is effectively suppressed and the number of switching times per unit time is reduced, thereby reducing the switching low and the conductive loss and increasing the efficiency.

Figure 4:
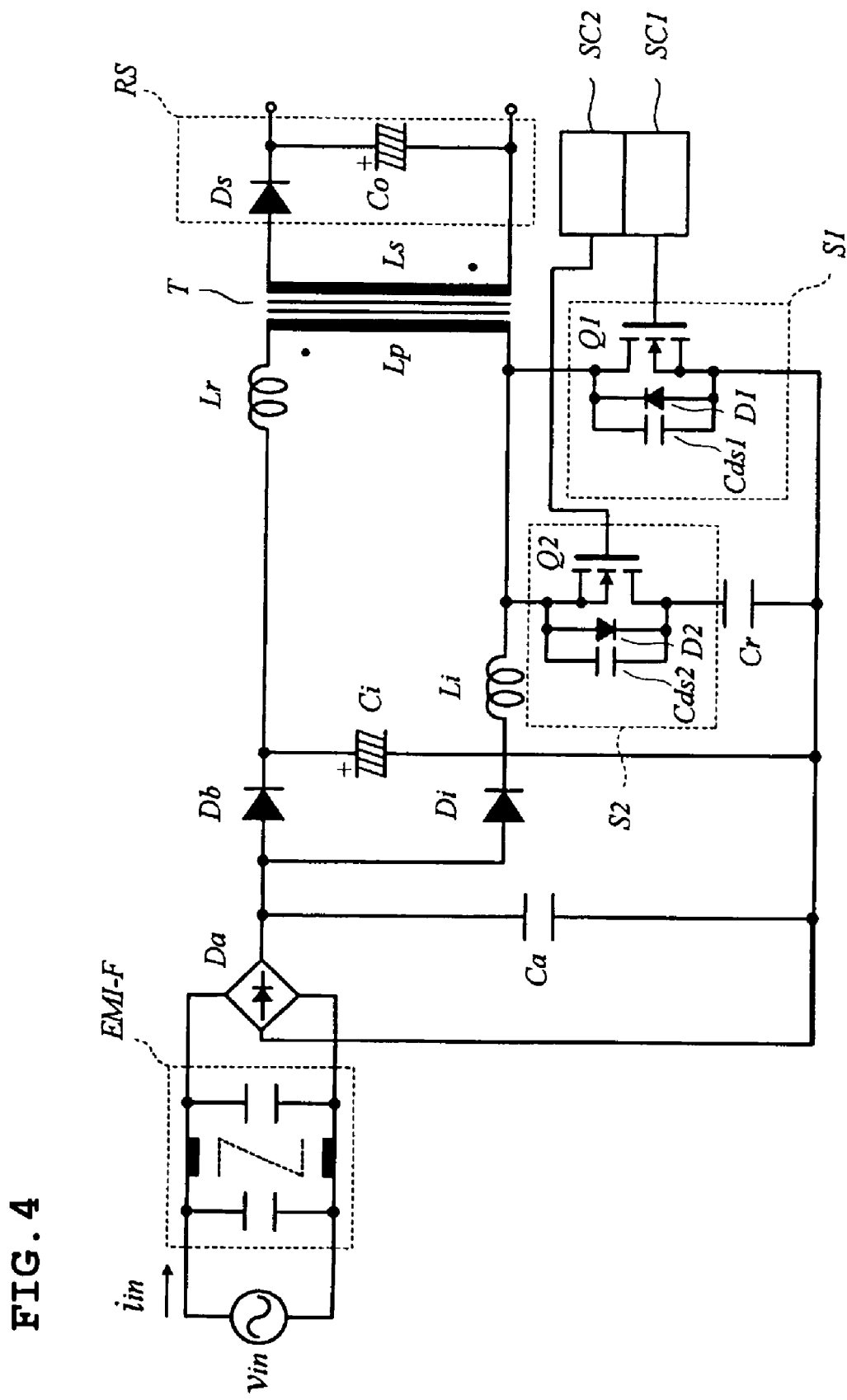
FIG. 4 is a circuit diagram showing a switching power supply apparatus according to a second preferred embodiment of the present invention.

Next, a description is given of a switching power supply apparatus according to the second preferred embodiment with reference to FIG. 4.

FIG. 4 is a circuit diagram. Unlike the switching power supply apparatus shown in FIG. 1, in the example, the serial circuit including the second switching circuit S2 and the fourth capacitor Cr is connected to the first switching circuit S1 in parallel therewith. Other structures are the same as those shown in FIG. 1. Referring to FIG. 4, the driving windings Lb1 and Lb2 of the transformer T and the feedback circuits FB1 and FB2 are not shown. The switching control circuits SC1 and SC2 are shown as blocks. The diode Dc shown in FIG. 1 is connected between an anode of the diode Di and the drain of the switching element Q2.

Even with the above-mentioned circuit structure, the same advantages as those according to the first preferred embodiment are obtained. The voltage applied to the capacitor Cr is increased. However, the amount of charges is constant and then, the capacitance of the capacitor Cr is reduced, thereby decreasing the size of the capacitor Cr.

Figure 5:
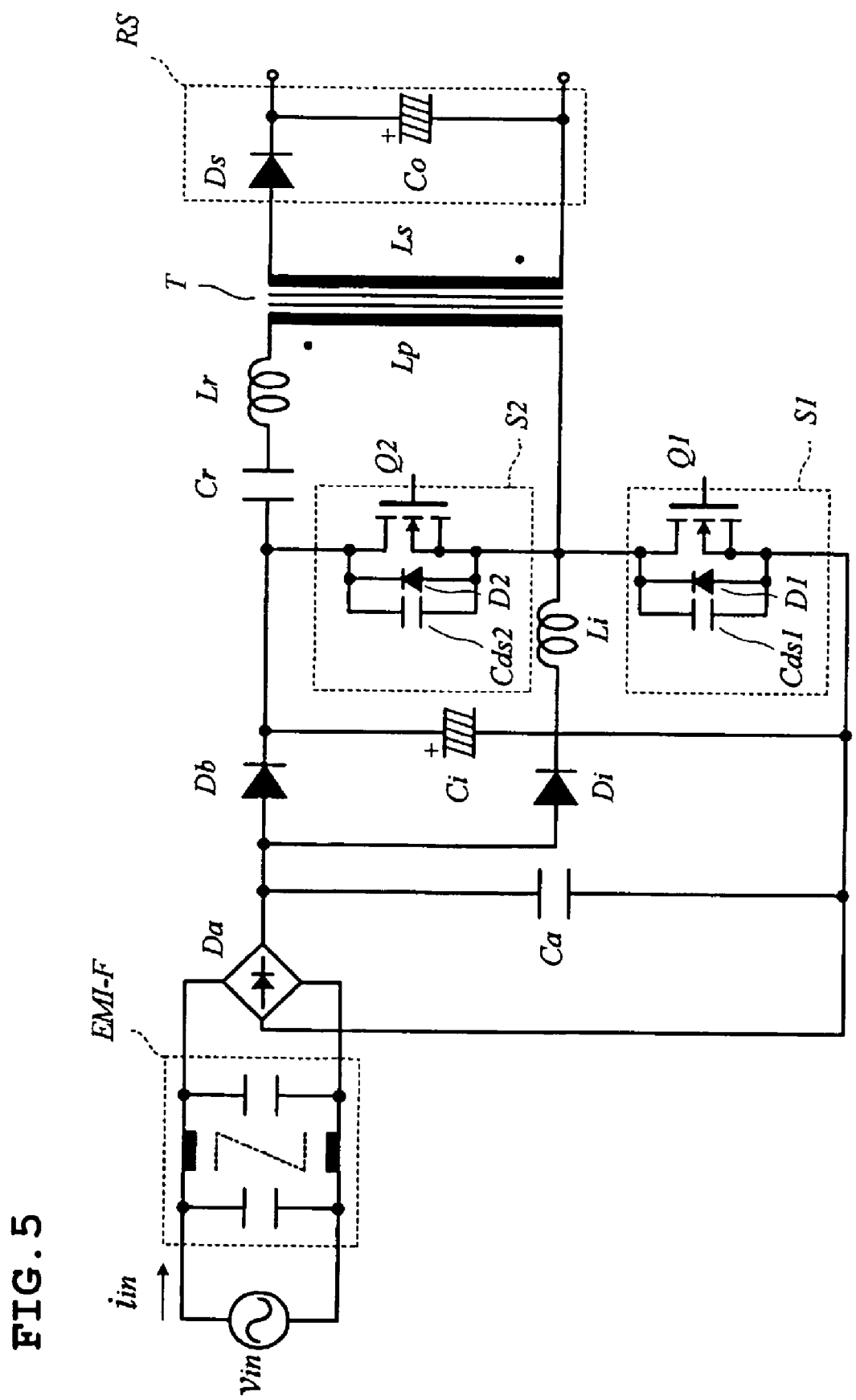
FIG. 5 is a circuit diagram showing a switching power supply apparatus according to a third preferred embodiment of the present invention.

FIG. 5 is a circuit diagram showing a switching power supply apparatus according to the third preferred embodiment. Unlike the structure shown in FIG. 1, in the example shown in FIG. 5, the fourth capacitor Cr is connected between one end of the third capacitor Ci and the first inductor Lr. The diode Dc shown in FIG. 1 is connected between the anode of the diode Di and the drain of the switching element Q2. The remaining structure is similar to that shown in FIG. 1. However, referring to FIG. 5, the driving winding Lb1 and Lb2 of the transformer T, the switching control circuit SC1 and SC2, and the feedback circuit FB1 and FB2 are not shown.

With the above-mentioned structure, the same advantages as those according to the first preferred embodiment are obtained.

Further, one end of the second switching element Q2 is connected to a connecting point between the third capacitor Ci and the fourth capacitor Cr serially-connected to the first inductor Lr. The voltage applied to the first and second switching elements Q1 and Q2 is reduced, and the voltage stress is reduced.

Figure 6:
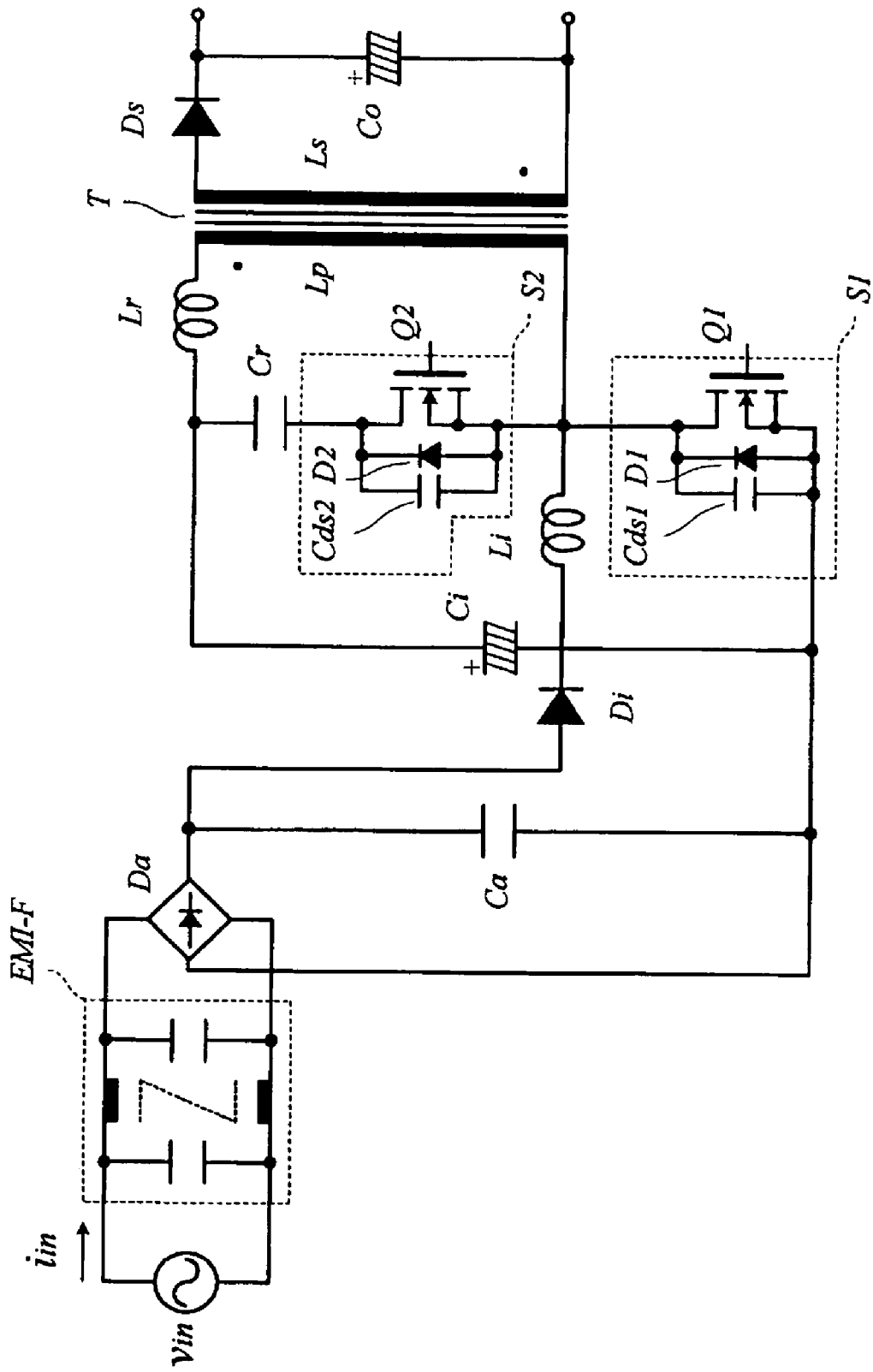
FIG. 6 is a circuit diagram showing a switching power supply apparatus according to a fourth preferred embodiment of the present invention.

FIG. 6 is a circuit diagram showing a switching power supply apparatus according to the fourth preferred embodiment. Unlike the switching power supply apparatus shown in FIG. 1, in the example shown in FIG. 6, the fourth diode Db shown in FIG. 1 is not provided. The fourth diode Db shown in FIG. 1 is provided to thereby supply the charge current to the third capacitor Ci. However, the diode Db and the capacitor Ci do not define a so-called capacitor-input rectifying and smoothing circuit. The capacitor Ci is charged via the first winding Lp or the switching circuit S2 of the transformer T. Therefore, the diode Db shown in FIG. 1 is not required. In the structure shown in FIG. 6, the diode Db is not required and the number of components is thus reduced. However, when the voltages at both ends of the capacitor Ci are lower than the voltages at both ends of the capacitor Ca at the start timing of the switching power supply apparatus or the high load timing, the current for charging the capacitor Ci flows to the transformer T. The transformer T is magnetized in the deviated direction. However, referring to FIG. 1, the diode Db is provided, thereby directly charging the capacitor Ci at the start timing or high-load timing, and therefore, the above-mentioned problem is solved.

Figure 7:
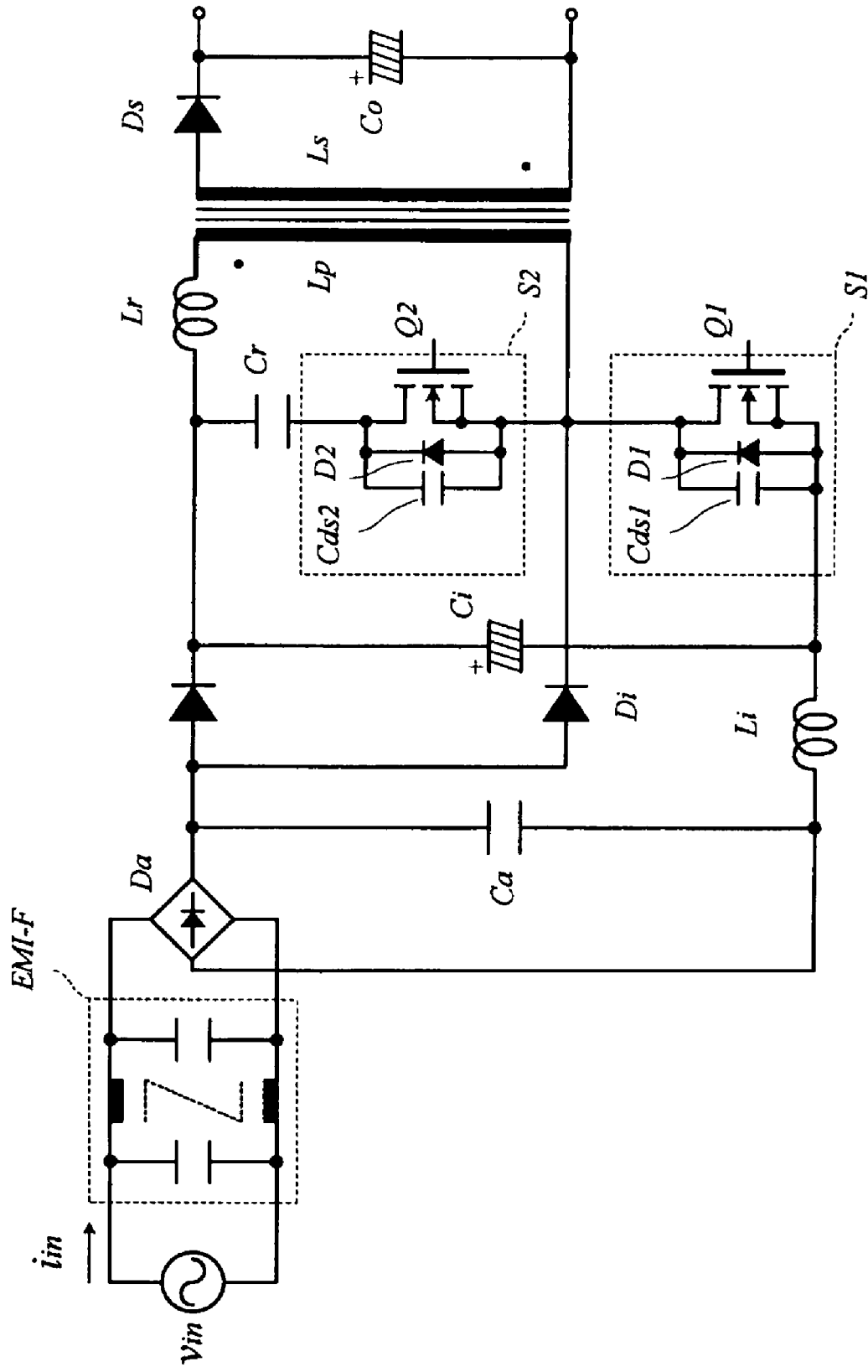
FIG. 7 is a circuit diagram showing a switching power supply apparatus according to a fifth preferred embodiment of the present invention.

FIG. 7 is a circuit diagram showing a switching power supply apparatus according to the fifth preferred embodiment. In the example shown in FIG. 1, the second inductor Li is arranged between a connecting point between the first and second switching circuits Si and S2 and the third diode Di. In the example shown in FIG. 7, the second inductor Li is arranged between a connecting point between the first switching circuit S1 and the capacitor Ci and the capacitor Ca. With the above-mentioned structure, the same advantages as those according to the first preferred embodiment are obtained.

Figure 8:
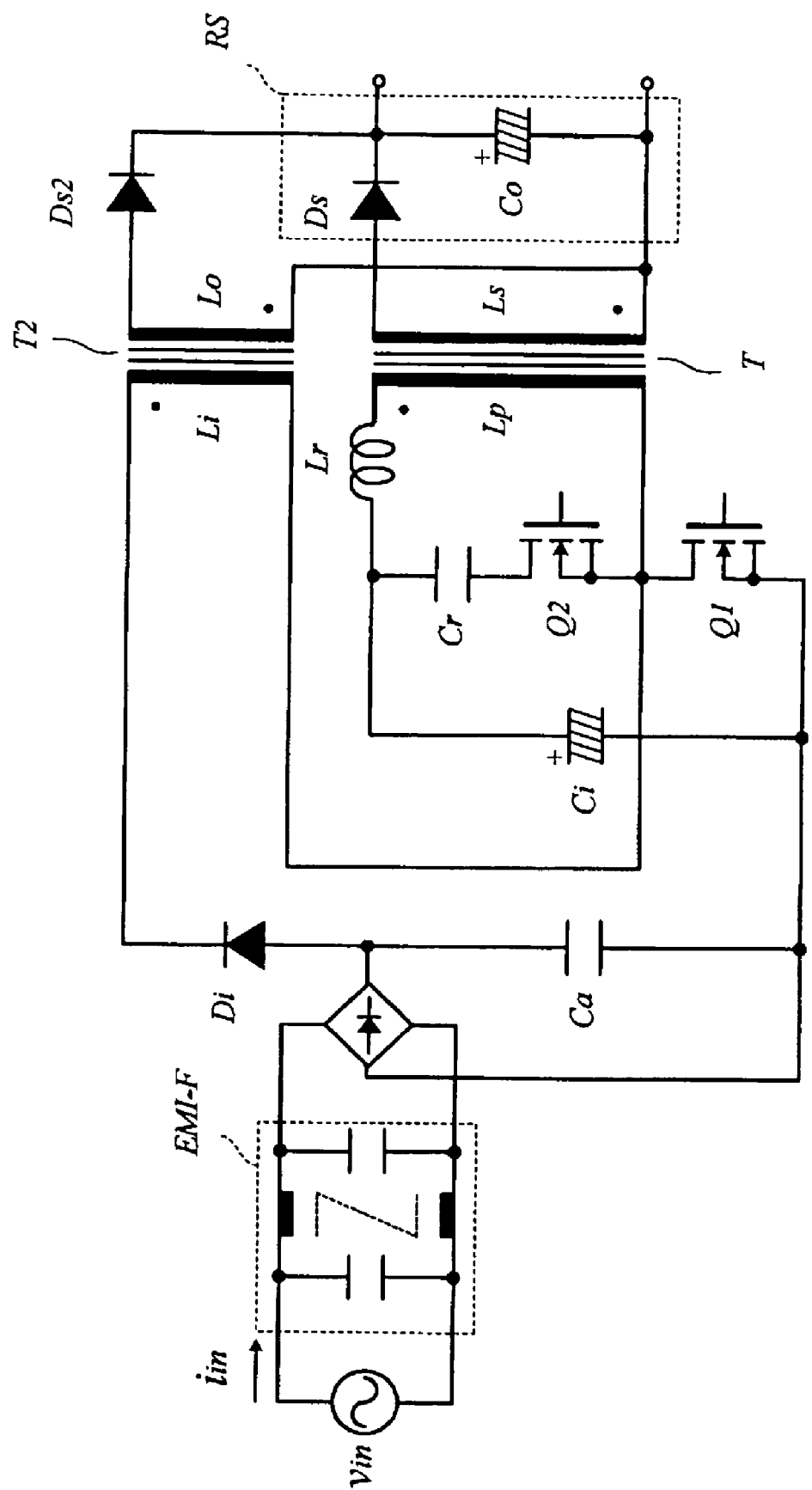
FIG. 8 is a circuit diagram showing a switching power supply apparatus according to a sixth preferred embodiment of the present invention.

FIG. 8 is a circuit diagram showing a switching power supply apparatus according to the sixth preferred embodiment. In the example shown in FIG. 8, the second transformer T2 is provided separately from the transformer T. An input winding Li of the second transformer T2 is used as the second inductor Li shown in FIG. 1. A rectifying circuit Ds2 is arranged between an output winding Lo of the second transformer T2 and the rectifying and smoothing circuit RS. Other structures are the same as those shown in FIG. 1. A component corresponding to the diode Db shown in FIG. 1 is not shown in FIG. 8.

With the above-mentioned structure, the energy charged in the inductor Li is directly supplied to the rectifying and smoothing circuit RS. In accordance therewith, the current of the transformer T is reduced, the conductive loss due to the winding of the transformer T is suppressed, and the efficiency is further improved. Incidentally, the rectifying circuit Ds2 and the rectifying circuit Ds are separated and different outputs can be supplied.

Figure 9:
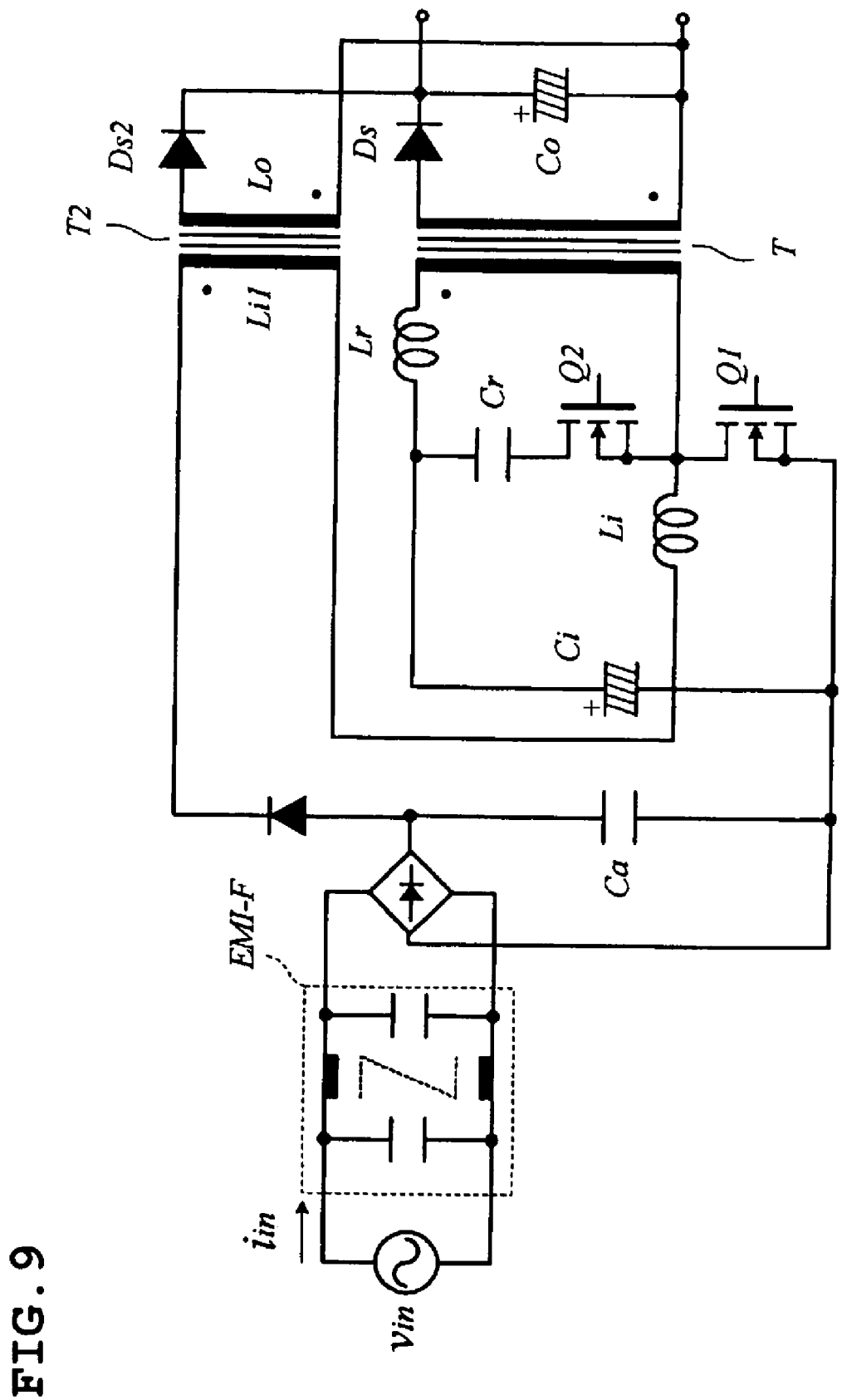
FIG. 9 is a circuit diagram showing a switching power supply apparatus according to the seventh preferred embodiment of the present invention.

FIG. 9 is a circuit diagram showing a switching power supply apparatus according to the seventh preferred embodiment. In the example shown in FIG. 9, the second transformer T2 is provided and inductor Li is serially connected to an input winding Li1 thereof. Other structures are the same as those shown in FIG. 8.

With the above-mentioned structure, the energy charged in the inductor Li1 is directly supplied to the rectifying and smoothing circuit RS. In accordance therewith, the current of the transformer T is reduced, the conductive loss due to the winding of the transformer T is reduced, and the efficiency is improved. Similar to the case shown in FIG. 8, the rectifying circuit Ds2 and the rectifying circuit Ds are separated, and different outputs can be supplied.

Figure 10:
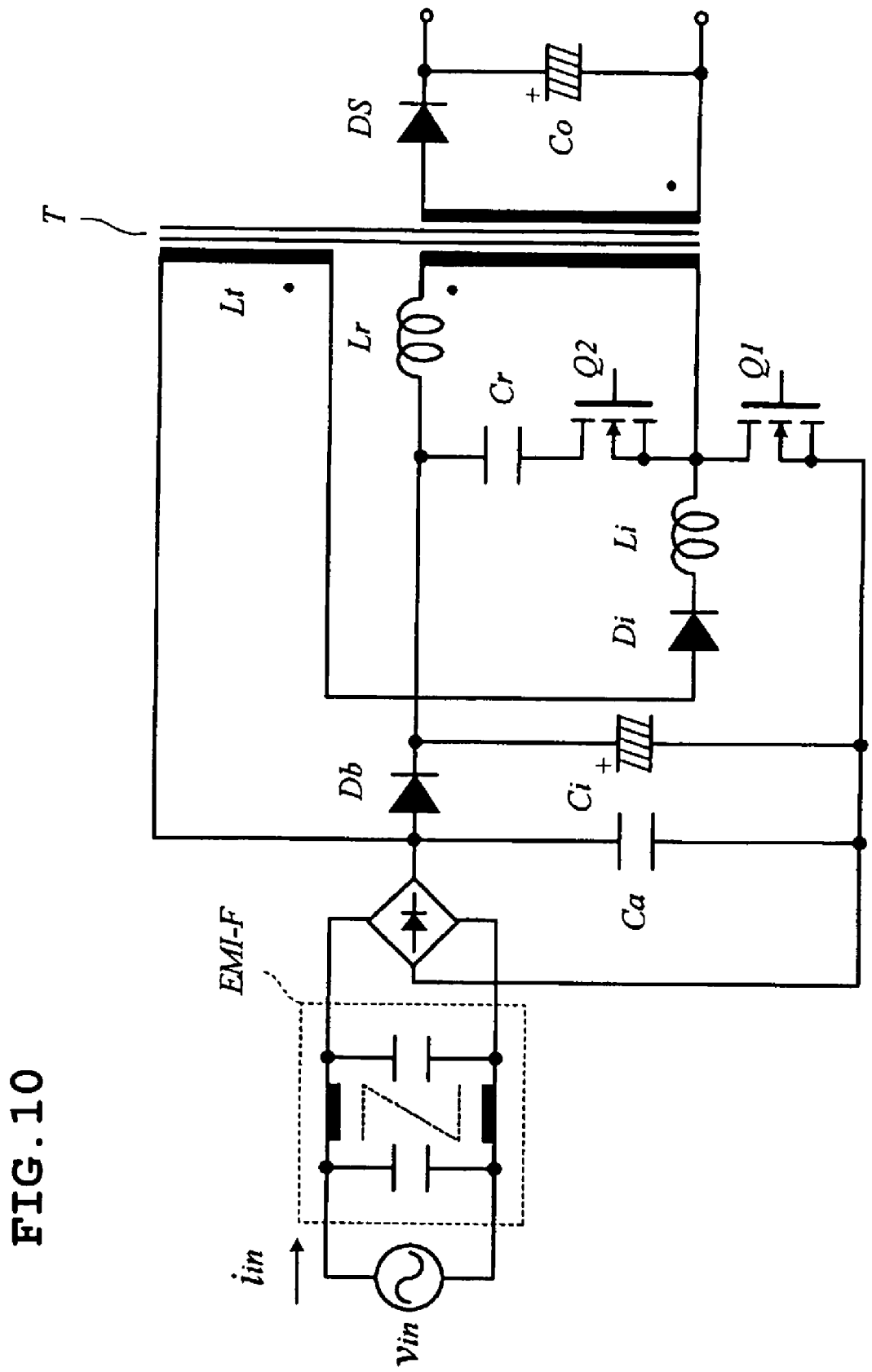
FIG. 10 is a circuit diagram showing a switching power supply apparatus according to the eighth preferred embodiment of the present invention.

FIG. 10 is a circuit diagram showing a switching power supply apparatus according to the eighth preferred embodiment. In the example shown in FIG. 10, a tri-winding Lt is arranged to the transformer T, and the tri-winding Lt is serially connected to the second inductor Li. Other structures are the same as those shown in FIG. 1.

With the structure shown in FIG. 10, the same advantages as those according to the first preferred embodiment are obtained. Further, the voltage applied to the inductor Li is adjusted by using the voltage generated in the tri-winding Lt of the transformer T. Thus, a conductive angle of the input current iin (conductive period in the half period of the commercial power voltage) is adjusted, thereby minimizing the harmonic current and reducing the loss. Further, by adjusting the turn ratio of the tri-winding Lt and the primary winding, the conductive angle is narrow and the excessive high voltage applied to the capacitor Ci is prevented.

FIG. 11 is a circuit diagram showing a switching power supply apparatus according to the ninth preferred embodiment. In the example shown in FIG. 11, the inductor Li is arranged between the diode Db and the capacitor Ca. Further, a diode Df and an inductor Lf are added to the rectifying and smoothing circuit RS, thereby defining a forward converter. Therefore, the polarity of the secondary winding Ls of the transformer T is opposite to the cases according to the first to eighth preferred embodiments. Other structures shown in FIG. 11 are the same as those shown in FIG. 1. With the structure shown in FIG. 11, the excitation energy is charged in the inductor Lf and, in accordance therewith, the transformer T is reduced in size.

Without changing the location of the inductor Li, the secondary side is set as a fly-back converter as shown in FIG. 1. Further, referring to FIGS. 1 and 4 to 10, similarly to the case shown in FIG. 11, the secondary side is set as a forward converter.

Figure 12:
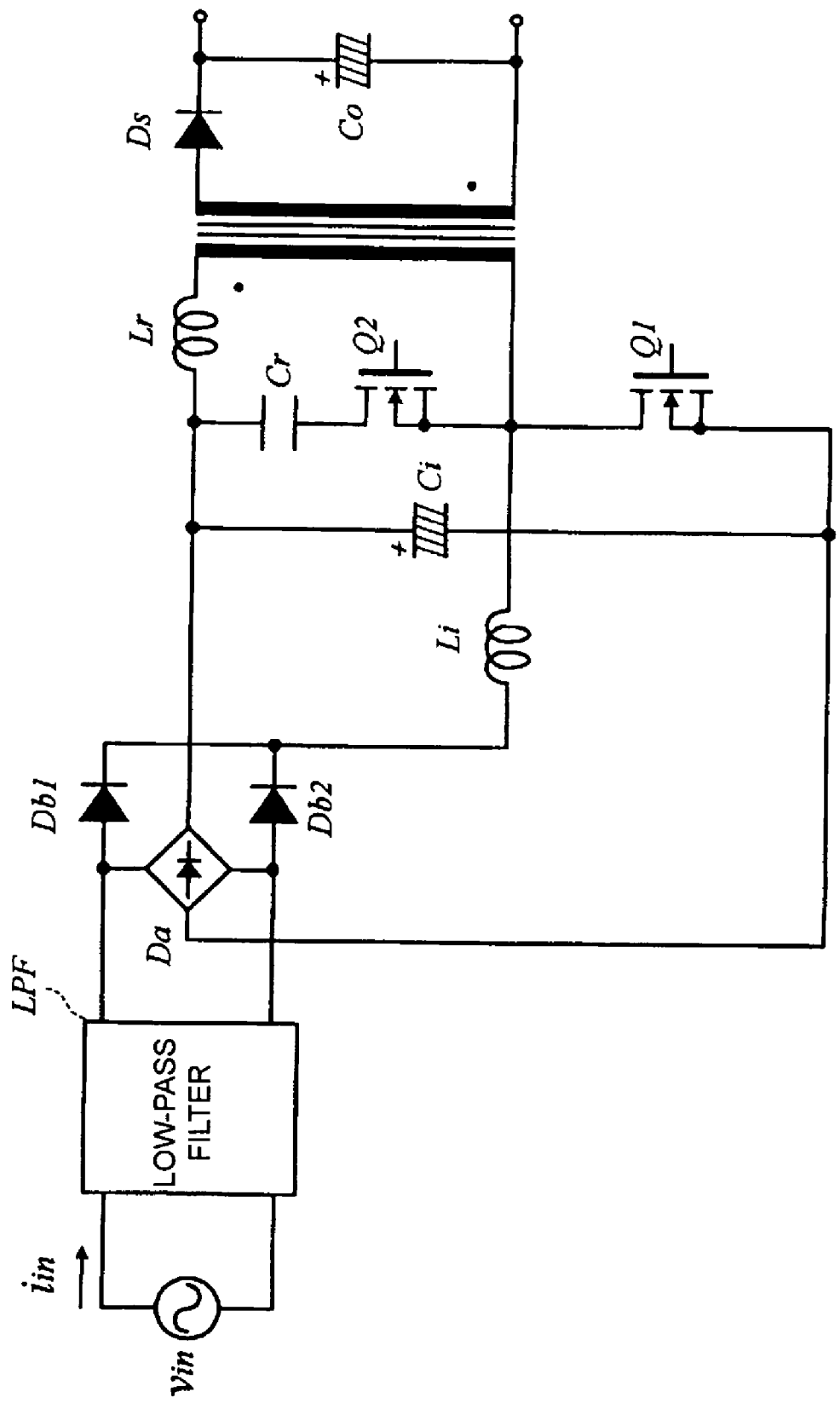
FIG. 12 is a circuit diagram showing a switching power supply apparatus according to a tenth preferred embodiment of the present invention.

FIG. 12 is a circuit diagram showing a switching power supply apparatus according to the tenth preferred embodiment. In the example shown in FIG. 12, diodes Db1 and Db2 are connected between both ends of the commercial power supply (AC input voltage line) and one end of the second inductor Li. Further, the low-pass filter LPF is connected to the AC input voltage line, and the third capacitor Ci is directly connected to a rectifying output of the rectifying circuit Da on the input side. The low-pass filter LPF prevents the returning operation of high-frequency current generated by the switching operation of the switching elements Q1 and Q2 to the input power supply.

With the above-mentioned structure, the same advantages as those according to the first preferred embodiment are obtained. Further, the low-pass filter LPF is arranged to the AC input voltage line, thereby improving the degree of freedom of the arrangement of parts.

Figure 13:
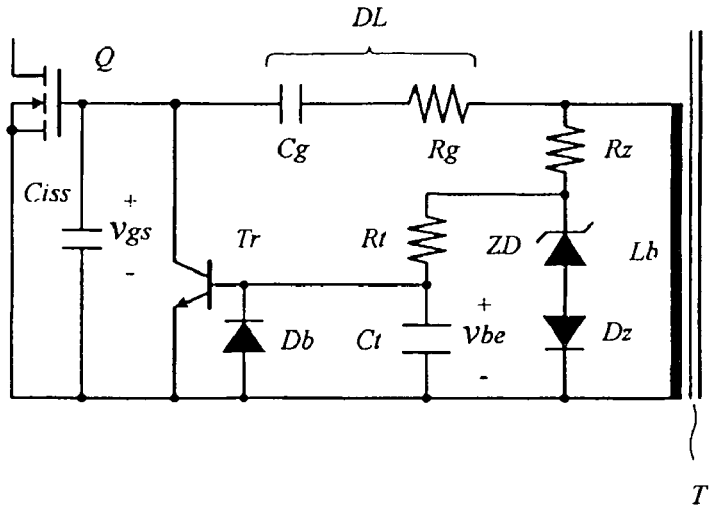
FIG. 13 is a diagram showing an example of a switching control circuit in a switching power supply apparatus according to an eleventh preferred embodiment of the present invention.
Figure 14:
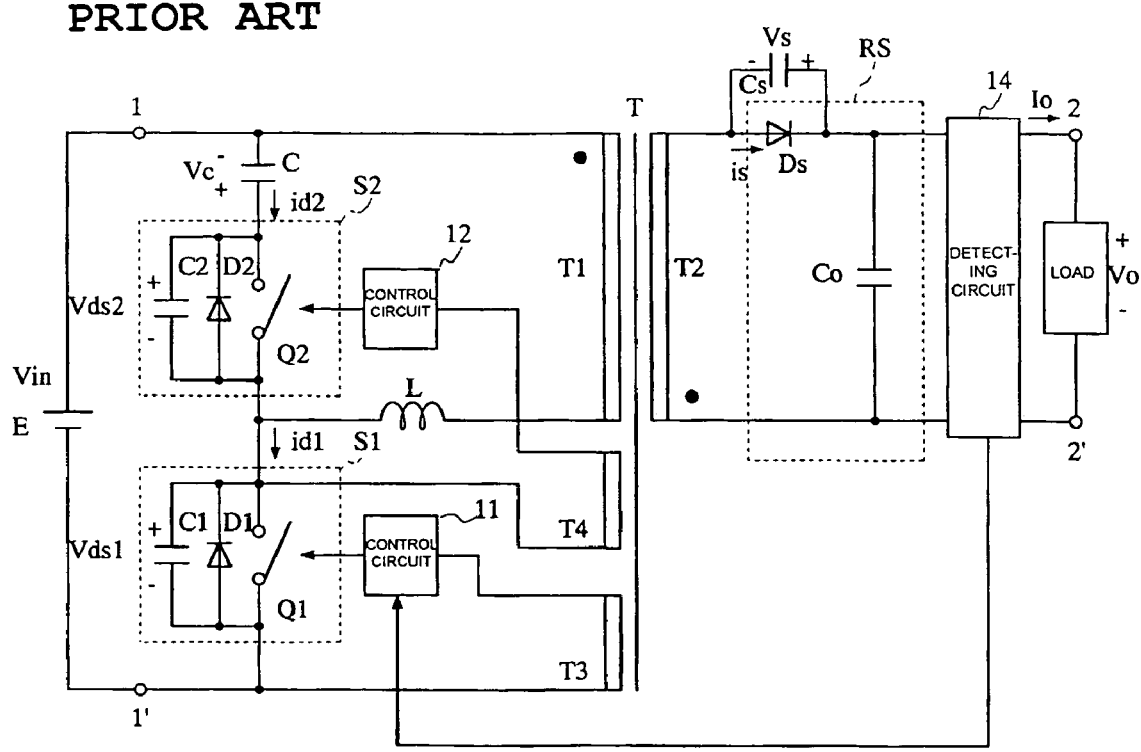
FIG. 14 is a circuit diagram showing a conventional switching power supply apparatus.
Figure 15:
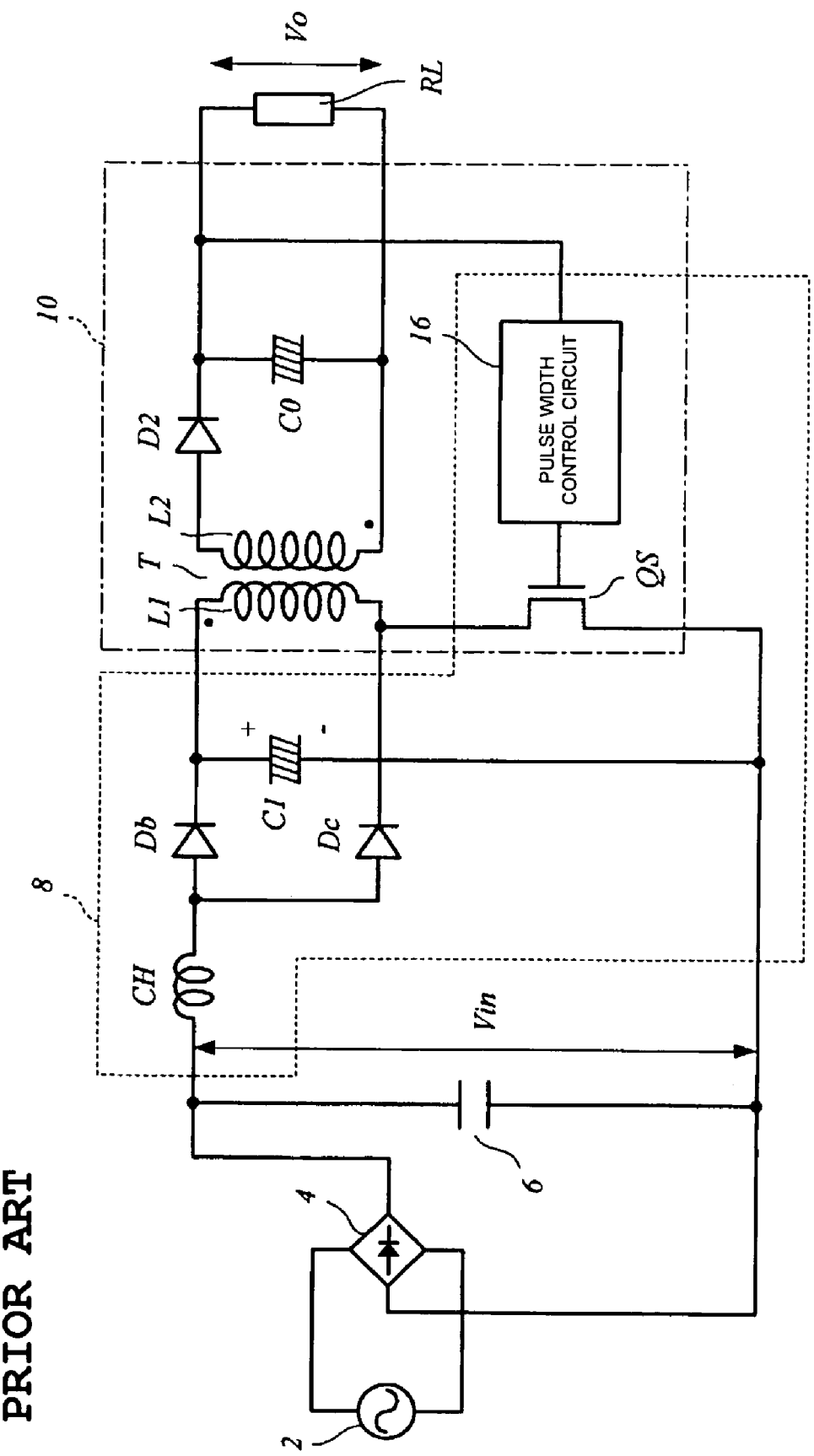
FIG. 15 is a circuit diagram showing another conventional switching power supply apparatus.
Figure 16:
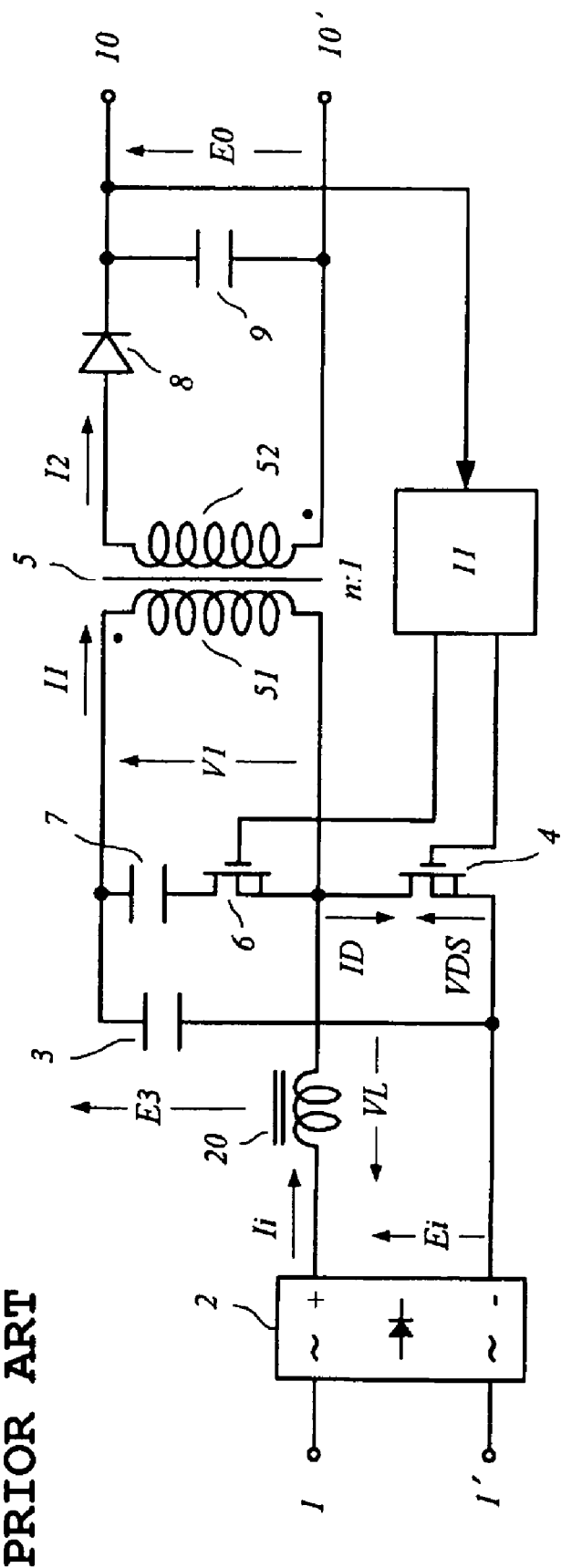
FIG. 16 is a circuit diagram showing another conventional switching power supply apparatus.

FIG. 13 is a circuit diagram showing an example of the structure of a switching power supply apparatus according to the eleventh preferred embodiment. In the example shown in FIG. 13, the serial circuit including the resistor Rz, the Zener diode ZD, and the diode Dz is connected to the driving winding Lb of the transformer T, and the serial circuit the resistor Rt and the capacitor Ct is connected to the serial circuit comprising the Zener diode ZD and the diode Dz. The voltage of the capacitor Ct is applied to a base of a transistor Tr. The diode Db arranged between the base and an emitter of the transistor Tr prevents the inverse voltage applied between the base and the emitter of the transistor Tr.

A serial circuit including the resistor Rg and the capacitor Cg forms the delay circuit DL which delays the turn-on operation of the switching element Q. Incidentally, a capacitor Ciss denotes an input capacitance of the switching element Q.

As mentioned above, since the constant voltage generated by the Zener diode ZD is supplied to the time-constant circuit including the resistor Rt and the capacitor Ct, the influence from the voltage change due to the driving winding-Lb is prevented. The impedance of the resistor Rt is controlled, thereby controlling the timing for turning-on the transistor Tr, that is, the on-period of the switching element Q.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the invention.

The invention claimed is:

1. A switching power supply apparatus comprising:
a first switching circuit including a first switching element, a first diode, and a first capacitor;
a first transformer including a primary winding and a secondary winding;
a first inductor serially-connected to the primary winding;
a rectifying and smoothing circuit connected to the secondary winding;
a rectifying circuit located on an input side of the switching power supply apparatus and including at least one rectifying element arranged to rectify an AC voltage;
a second inductor connected so that a rectifying voltage obtained by the rectifying circuit is applied for an on-period so as to set the first switching circuit to a conductive state;
a second switching circuit including a parallel connecting circuit including a second switching element, a second diode, and a second capacitor;
a third capacitor connected so that excitation energy in the second inductor is charged and a voltage is applied to the primary winding of the first transformer for the on-period;
a switching control circuit arranged to control the first switching element so as to obtain an output from the rectifying and smoothing circuit connected to the secondary winding; and
a fourth capacitor serially-connected to the second switching circuit to define a serial circuit; wherein
one end of the serial circuit of the second switching circuit and the fourth capacitor is connected to one end of the first switching circuit;
said switching control circuit controls the operation so that the first switching element is turned off and then the second switching element is turned on, and the second switching element is turned off and then the first switching element is turned on, thereby controlling the amount of charging of the third capacitor via the first switching circuit for the on-period; and
the excitation energy in the second inductor is charged to the third capacitor when the first switching element is turned off.

2. A switching power supply apparatus according to claim 1, wherein said switching control circuit controls the on-period of the first switching element so as to stabilize an output voltage obtained by the rectifying and smoothing circuit.

3. A switching power supply apparatus according to claim 1, wherein said switching control circuit controls the on-period of the second switching element in accordance with voltages at both ends of the third capacitor.

4. A switching power supply apparatus according to claim 1, wherein said switching control circuit controls the on-period of the second switching element so as to stabilize an output voltage obtained by said rectifying and smoothing circuit, and controls the on-period of the first switching element in accordance with voltages at both ends of the third capacitor.

5. A switching power supply apparatus according to claim 1, wherein a second transformer different from said first transformer is provided, the second inductor includes an input winding of the second transformer, and another rectifying circuit is arranged between an output winding of the second transformer and the rectifying and smoothing circuit.

6. A switching power supply apparatus according to claim 1, wherein a second transformer different from said first transformer is provided, an input winding of the second transformer is serially connected to the second inductor, and another rectifying circuit is arranged between an output winding of the second transformer and the rectifying and smoothing circuit.

7. A switching power supply apparatus according to claim 1, wherein a tri-winding is provided in said first transformer, and said second inductor is serially connected to said tri-winding.

8. A switching power supply apparatus according to claim 1, wherein at least one driving winding is provided in said first transformer, and said switching control circuit drives said first switching element or said second switching element by using voltages generated in said at least one driving winding.

9. A switching power supply apparatus according to claim 8, wherein delay circuits including serial circuits having resistors and capacitors are arranged between control terminals between the at least one driving winding and the first and second switching elements, said switching control circuit delays the at least one driving winding after generating voltages for turning on the first and second switching elements, and turns on the first and second switching elements.

10. A switching power supply apparatus according to claim 9, wherein delay times of said delay circuits are set so as to be turned-on after the voltages applied to both the ends of the first and second switching elements are reduced to zero voltage or near zero voltage.

11. A switching power supply apparatus according to claim 1, wherein said switching control circuit comprises time-constant circuits arranged to turn-off said first and second switching elements after a predetermined time of the generation of voltages for turning-on said first and second switching elements in said driving windings.

12. A switching power supply apparatus according to claim 1, wherein said switching control circuit controls said first switching element so as to set an intermittent oscillation operating mode for periodically repeating an oscillation period to turn on/off said first and second switch elements and an oscillation stop period for stopping the oscillation at the timing of low load or non-load.

13. A switching power supply apparatus according to claim 1, wherein a leakage inductance of said first transformer comprises the first inductor.

14. A switching power supply apparatus according to claim 1, wherein at least one of the first switching circuit and the second switching circuit comprises a field-effect transistor.

15. A switching power supply apparatus comprising:
- a first switching circuit including a first switching element;
- a first transformer including a primary winding and a secondary winding;
- a first inductor serially-connected to the primary winding;
- a rectifying and smoothing circuit connected to the secondary winding;
- a rectifying circuit located on an input side of the switching power supply apparatus;
- a second inductor connected so that a rectifying voltage obtained by the rectifying circuit is applied for an on-period so as to set the first switching circuit to a conductive state;
- a second switching circuit including a second switching element and being connected to one end of the first switching circuit;
- a capacitor arranged so that the first inductor, the primary winding and the second switching circuit define a closed loop;
- another capacitor connected so that excitation energy in the second inductor is charged and a voltage is applied to the primary winding of the first transformer for the on-period; and
- at least one switching control circuit arranged to control the on-period of the first switching element to control an output voltage, and further to control an input voltage by controlling the on-period of the second switching element; wherein the excitation energy in the second inductor is charged to the another capacitor when the first switching element is turned off.

16. A switching power supply apparatus according to claim 15, wherein the capacitor is serially-connected to the second switching circuit, and one end of the serial circuit of the second switching circuit and the capacitor is connected to one end of the first switching circuit.

17. A switching power supply apparatus according to claim 15, wherein said at least one switching control circuit controls the on-period of the second switching element so as to stabilize an output voltage obtained by said rectifying and smoothing circuit, and controls the on-period of the first switching element in accordance with voltages at both ends of another capacitor which is connected so that excitation energy in the second inductor is charged and a voltage is applied to the primary winding of the first transformer for the on-period.

18. A switching power supply apparatus according to claim 15, wherein a second transformer different from said first transformer is provided, the second inductor includes an input winding of the second transformer, and the rectifying circuit is arranged between an output winding of the second transformer and the rectifying and smoothing circuit.

19. A switching power supply apparatus according to claim 15, wherein at least one driving winding is provided in said first transformer, and said at least one switching control circuit drives said first switching element or said second switching element by using voltages generated in said at least one driving winding.

20. A switching power supply apparatus according to claim 15, wherein delay circuits including serial circuits having resistors and capacitors are arranged between control terminals between the at least one driving winding and the first and second switching elements, said at least one switching control circuit delays the at least one driving winding after generating voltages for turning on the first and second switching elements, and turns on the first and second switching elements.

* * * * *